(12) United States Patent
van Thiel et al.

(10) Patent No.: US 12,109,987 B2
(45) Date of Patent: Oct. 8, 2024

(54) FAIL-SAFETY VALVE UNIT FOR A PARKING BRAKE FUNCTION AND PARKING BRAKE VALVE ARRANGEMENT

(71) Applicant: ZF CV Systems Global GmbH, Bern (CH)

(72) Inventors: Julian van Thiel, Grossburgwedel (DE); Oliver Wulf, Neustadt (DE)

(73) Assignee: ZF CV Systems Global GmbH, Bern (CH)

( * ) Notice: Subject to any disclaimer, the term of this patent is extended or adjusted under 35 U.S.C. 154(b) by 343 days.

(21) Appl. No.: 17/832,357

(22) Filed: Jun. 3, 2022

(65) Prior Publication Data

US 2022/0297656 A1 Sep. 22, 2022

Related U.S. Application Data

(63) Continuation of application No. PCT/EP2020/084042, filed on Dec. 1, 2020.

(30) Foreign Application Priority Data

Dec. 4, 2019 (DE) .................... 10 2019 133 010.6

(51) Int. Cl.
*B60T 13/68* (2006.01)
*B60T 13/26* (2006.01)
*B60T 13/38* (2006.01)

(52) U.S. Cl.
CPC .......... *B60T 13/683* (2013.01); *B60T 13/263* (2013.01); *B60T 13/385* (2013.01); *B60T 2270/413* (2013.01)

(58) Field of Classification Search
CPC .... B60T 13/263; B60T 13/385; B60T 13/683; B60T 2270/413

(Continued)

(56) References Cited

U.S. PATENT DOCUMENTS

2009/0184568 A1 7/2009 Bensch et al.
2010/0304929 A1 12/2010 Hilberer
(Continued)

FOREIGN PATENT DOCUMENTS

DE 100 62 625 A1 10/2001
DE 10 2005 060 225 A1 6/2007
(Continued)

OTHER PUBLICATIONS

International Search Report of the European Patent Office dated Feb. 15, 2021 for international application PCT/EP2020/084042 on which this application is based.

(Continued)

*Primary Examiner* — Christopher P Schwartz
(74) *Attorney, Agent, or Firm* — Walter Ottesen, P.A.

(57) ABSTRACT

The disclosure is directed to a fail-safety valve unit for a parking brake function of an electronically controllable pneumatic braking system for a utility vehicle. The fail-safety valve unit has a monostable release valve and a ventilating valve. The release valve, when energized, provides a release pressure at a first release valve port for the parking brake function and, when de-energized, connects the first release valve port to the ventilating valve. The ventilating valve has a nonlinear ventilating characteristic which permits ventilating of the release valve port from the release pressure to a partial brake pressure with a first gradient, and ventilating of the release valve port from the partial brake pressure to a full brake pressure with a second gradient, wherein the first gradient is greater than the second gradient. A parking brake module and a vehicle are part of the disclosure.

15 Claims, 6 Drawing Sheets

(58) Field of Classification Search
USPC ............................... 303/7, 9.66, 15, 20, 127
See application file for complete search history.

(56) References Cited

U.S. PATENT DOCUMENTS

| | | |
|---|---|---|
| 2011/0168505 A1 | 7/2011 | Hilberer |
| 2017/0267221 A1 | 9/2017 | Hecker et al. |
| 2018/0251105 A1 | 9/2018 | Baehrle-Miller et al. |
| 2019/0152459 A1 | 5/2019 | Dieckmann et al. |
| 2019/0193705 A1 | 6/2019 | Wulf |
| 2019/0248346 A1 | 8/2019 | Wulf |
| 2019/0248350 A1 | 8/2019 | Wulf |
| 2019/0248351 A1 | 8/2019 | Wulf |
| 2020/0023820 A1 | 1/2020 | Van Thiel |
| 2020/0023827 A1 | 1/2020 | Van Thiel |
| 2020/0070795 A1 | 3/2020 | Van Thiel |
| 2020/0148180 A1 | 5/2020 | Van Thiel |
| 2022/0080939 A1* | 3/2022 | Brütt .................... B60T 13/263 |
| 2022/0297655 A1* | 9/2022 | Dieckmann ........... B60T 13/683 |

FOREIGN PATENT DOCUMENTS

| | | |
|---|---|---|
| DE | 10 2007 023 345 A1 | 11/2008 |
| DE | 10 2014 013 756 B3 | 2/2016 |
| DE | 10 2015 216 214 A1 | 3/2017 |
| DE | 10 2016 005 318 A1 | 11/2017 |
| DE | 10 2016 010 461 A1 | 3/2018 |
| DE | 10 2016 010 462 A1 | 3/2018 |
| DE | 10 2016 010 463 A1 | 3/2018 |
| DE | 10 2016 010 464 A1 | 3/2018 |
| DE | 10 2017 002 716 A1 | 9/2018 |
| DE | 10 2017 002 718 A1 | 9/2018 |
| DE | 10 2017 002 719 A1 | 9/2018 |
| DE | 10 2017 002 721 A1 | 9/2018 |
| EP | 2 133 247 A2 | 12/2009 |

OTHER PUBLICATIONS

Translation and Written Opinion of the International Searching Authority dated Feb. 15, 2021 for international application PCT/EP2020/084042 on which this application is based.

* cited by examiner

FAIL-SAFETY VALVE UNIT FOR A PARKING BRAKE FUNCTION AND PARKING BRAKE VALVE ARRANGEMENT

CROSS REFERENCE TO RELATED APPLICATIONS

This application is a continuation application of international patent application PCT/EP2020/084042, filed Dec. 1, 2020 designating the United States and claiming priority from German application 10 2019 133 010.6, filed Dec. 4, 2019, and the entire content of both applications is incorporated herein by reference.

TECHNICAL FIELD

The present disclosure relates to a fail-safety valve unit for a parking brake function of an electronically controllable pneumatic braking system for a utility vehicle, wherein the fail-safety valve unit has a monostable release valve and a ventilating valve.

The disclosure furthermore relates to a parking brake valve arrangement for an electronically controllable pneumatic braking system for a utility vehicle having such a fail-safety valve unit, and to a vehicle, in particular utility vehicle, having an electronically controllable pneumatic braking system and a parking brake valve arrangement of the abovementioned type.

BACKGROUND

In modern electronically controllable pneumatic braking systems, which are used in particular in utility vehicles that are intended for autonomous driving, it is important to provide measures that allow safe deceleration of the utility vehicle even in the event of a fault in the braking system. Approaches here include using fully redundant braking systems, partially redundant braking systems or only different levels in one braking system, such that, in the event of a fault in a first level, the braking system can continue to be operated, at least with restrictions, in a second level.

However, if a double fault occurs, for example, which affects both the primary braking system and the redundant braking system, there is the risk that the utility vehicle can no longer be braked in a controlled manner. In such situations, there is a need to provide a system that allows safety deceleration of the vehicle.

A system that is aimed in particular at achieving high residual availability is known, for example, from US 2017/0267221. The document discloses electrical equipment of a vehicle with an at least partially electric braking and steering device, which comprises: an electric or electromechanical steering device, which is connected to a steering gear and which comprises an electronic steering control device and an electric steering actuator, and a service brake device. As a service brake device, US 2017/0267221 proposes an electropneumatic service brake device which comprises an electromagnetic service brake valve device, an electronic brake control device, electropneumatic modulators and pneumatic wheel brake actuators, wherein the electronic brake control device electrically controls the electropneumatic modulators in order to generate pneumatic brake pressures or brake control pressures for the pneumatic wheel brake actuators on a wheel-specific, axle-specific or side-specific basis. The electropneumatic service brake valve device has a service brake actuation element and also, within an electrical service brake circuit, an electrical channel with an electrical brake signal transmitter that can be actuated by the service brake actuation element. Furthermore, an electronic evaluation device is provided which receives the actuation signals and, in a manner dependent on the actuation signals, inputs braking demand signals into the electronic brake control device and, within at least one pneumatic service brake circuit, comprises at least one pneumatic channel, in which actuation of the service brake actuation element owing to a driver's braking demand causes at least one control piston of the service brake valve device to be loaded with a first actuating force and, in response to this, the control piston makes it possible to generate pneumatic brake pressures or brake control pressures for the pneumatic wheel brake actuators. The electronic evaluation device of the electropneumatic service brake valve device furthermore comprises electronic control means for generating, independently of a driver's braking demand, a second actuating force which, in the presence of a braking demand that is independent of the driver's demand, acts on the control piston in the same direction as or in the opposite direction to the first actuating force. The electropneumatic service brake device is supplied by an electrical power source which is independent of a second electrical power source which supplies the electropneumatic service brake valve device with electrical power. It is hereby ensured that as far as possible always at least one of the two systems is functional. The electric or electropneumatic steering device is supplied with power by the second electrical power source. It is sought in this way to achieve high residual availability. However, the system is complex and thus cannot be readily implemented in every utility vehicle.

A system that provides electronically pneumatically controlled redundancy is disclosed in US 201910152459. The system disclosed in the document uses a bypass valve in order, depending on the failure of a subsystem, to transmit control pressures in order to provide an at least pneumatic supply to the circuit in which an electrical failure has respectively occurred. This, too, increases the residual availability. Similar systems are disclosed in US 2019/0193705 and in US 2019/0248351.

Furthermore, US 201910248350 discloses a system and a method in which pilot control valves are electronically controlled by way of a redundancy signal if a failure or a defect is detected in the electronic control of wheel brakes of the braking system. Here, the system seeks to prevent the wheels from locking.

US 2020/0023820, US 2020/0023827, US 2020/0070795 and US 2020/0148180 have disclosed systems in which a redundancy is generated pneumatically in each case. Here, different output brake pressures, for example front axle, rear axle or trailer brake pressures, are used in order to be provided as redundancy pressure to failed systems, such as the front axle brake circuit, rear axle brake circuit, parking brake circuit or trailer brake circuit. In this way, a subordinate pneumatic redundancy level is generated, such that high residual availability is likewise achieved.

Furthermore, systems also exist which incorporate the trailer, as disclosed for example in US 2019/0248346.

SUMMARY

An object of the present disclosure is to provide a system which allows safe stopping of the vehicle even when redundant systems, subsystems or levels of the braking system have failed. For example, if a braking system is supplied from several power sources, in the worst case all of the power sources may fail, in this case, too, it is sought to ensure in a simple manner that the vehicle can be safely decelerated.

The disclosure solves this problem by a simple "fail-safe extension" in the parking brake system. In more precise terms, the fail-safety valve unit solves the problem, in a first aspect of the disclosure, in that the release valve, when energized, provides a release pressure at a first release valve port for the parking brake function and, when de-energized, connects the first release valve port to the ventilating valve for ventilating the first release valve port, where the ventilating valve has a nonlinear ventilating characteristic which permits ventilating of the first release valve port from the release pressure to a partial brake pressure with a first gradient, and ventilating of the release valve port from the partial brake pressure to a full brake pressure with a second gradient, wherein the first gradient is greater than the second gradient.

The concept of the disclosure includes a monostable control of the parking brake or holding brake. For this purpose, when the parking brake is activated, the parking brake is vented via the monostable release valve and is thus released by the release valve, when energized, providing a release pressure. If, by contrast, the release valve is switched to a de-energized state, for example due to a fault in a master unit, the parking brake is ventilated and the vehicle can be braked. According to the disclosure, the parking brake is not directly and immediately ventilated here, but rather via the ventilating valve with a nonlinear ventilating characteristic. The nonlinear ventilating characteristic is configured in such a manner that the release valve port is initially ventilated from a release pressure to a partial brake pressure with a first gradient. The release pressure can preferably be the pressure which is at least required in order to completely release the spring brakes which are provided in the parking brake. The intention, according to the disclosure, is for rapid ventilation from the release pressure to the partial brake pressure to be performed. The partial brake pressure can preferably be configured in such a way that the vehicle is not completely, but rather only partially braked. The intention is therefore for braking to already be generated without axles being directly locked. From the partial brake pressure, at which partial braking is carried out, to the full brake pressure, at which the spring brake cylinders are completely ventilated in a corresponding manner and therefore fully applied, the ventilation is performed with a second gradient. The second gradient is smaller than the first gradient, and therefore the braking of the partial brake pressure to the full brake pressure takes place more slowly. In this way, it is possible to provide safe deceleration of the vehicle and to counteract the risk of direct blocking of axles. It is not required in this connection for the first and second gradients to be constant. On the contrary, the first and second gradients can also define nonlinear ventilating characteristics. It is, on the contrary, preferred for an average gradient during the ventilating of the first release valve port from the release pressure to the partial brake pressure, to be greater than an average gradient during the ventilating of the release valve port from the partial brake pressure to the full brake pressure. The first and second gradients can preferably be constant. The first gradient can preferably correspond to 1.2 times to 100 times, preferably to 1.2 times to 20 times the second gradient.

It will be understood that the release valve is not inevitably an individual, singular valve, but rather preferably includes the interconnection of a plurality of valves, as described in more detail below. However, it is preferred for the release valve to be a constructional unit.

In a first embodiment, the ventilating valve has at least one pressure limiter and at least one throttle which is arranged parallel to the pressure limiter and permits overflowing of the pressure limiter. It is also possible to provide two or more pressure limiters and also two or mare throttles per pressure limiter. By provision of the pressure limiter and the throttle for the overflowing of the pressure limiter, it is possible to provide a nonlinear ventilating characteristic in a simple manner. For example, the ventilating of the release valve port from the release pressure to the partial brake pressure is predominantly implemented via the pressure limiter, while the ventilating of the release valve port from the partial brake pressure to the full brake pressure is predominantly implemented via the throttle.

In an embodiment, the release valve has a first 3/2-way release valve with a second release valve port and a third release valve port. For the situation in which the release valve has only the 3/2-way release valve or is configured as the latter, it is also provided that the first release valve port is formed on the first 3/2-way release valve. The second release valve port is connected to a supply preferably for the purposes of receiving supply pressure, and the third release valve port is preferably connected to the ventilating valve. In this way, the 3/2-way release valve can connect the first release valve port alternately to the second and the third release valve port such that the supply pressure is alternately provided to the first release valve port and the latter is ventilated. It is preferably provided that, in a first, de-energized switching position, the first 3/2-way release valve connects the first release valve port to the third release valve port, and, in a second, energized switching position, connects the first release valve port to the second release valve port.

In a further embodiment, it is provided that, in addition to the first 3/2-way release valve, the release valve also has a second 3/2-way release valve. In this case, it is preferably provided that the second 3/2-way release valve has the first release valve port. Furthermore, the second 3/2-way release valve preferably has a fourth release valve port and a fifth release valve port. The fourth release valve port is preferably connected to the first 3/2-way release valve; more precisely, in this case, to a sixth release valve port, and the fifth release valve port is connected in this case preferably to the ventilating valve. As before, preferably, the second release valve port, which is formed on the first 3/2-way release valve, is connected to the supply, and the third release valve port, which is likewise formed on the first 3/2-way release valve, is connected, as before, to the ventilating valve. In this embodiment, accordingly, preferably both the third release valve port and the fifth release valve port are connected to the ventilating valve, for example via a T piece or directly. In this embodiment, a partial cascading of the first and second 3/2-way release valves is therefore provided. The first and second 3/2-way release valves of the release valve are preferably connected in such a manner that both the first 3/2-way release valve and the second 3/2-way release valve have to be energized in order to output the release pressure. As soon as either the first 3/2-way release valve or the second 3/2-way release valve or both 3/2-way release valves are de-energized, preferably the first release valve port is ventilated, specifically via the ventilating valve, which has the nonlinear ventilating characteristic. The safety can thereby be further improved. A single fault can thus lead directly to ventilation, and it is not required for a double fault to be immediately present. For example, it can be provided that the first and second 3/2-way release valves are controlled by separate electronic control units such that a failure in one of the control units already leads to the controlled deceleration of the vehicle.

In a further embodiment of the fail-safety valve unit, a shuttle valve is furthermore provided which is connected to the first release valve port for the purposes of inputting the release pressure into the parking brake function.

The shuttle valve can preferably be configured as a "select high valve" and has a first shuttle valve port, a second shuttle valve port, and a third shuttle valve port. The first shuttle valve port can preferably be connected to the first release valve port and, from the latter, receives the release pressure, if the latter is output. The second shuttle valve port can preferably be connected to an electropneumatic parking brake valve arrangement and receives either a parking brake control pressure, which is provided by a pilot control valve unit, or a spring brake pressure, which is provided by a main valve unit of the parking brake valve arrangement. The shuttle valve then outputs the higher of the two pressures that are present at the first and second shuttle valve ports, that is, the release pressure and either the parking brake control pressure or the spring brake pressure, at the third shuttle valve port. The third shuttle valve port is then either connected directly to a spring-type actuator port, to which one or more spring brake cylinders can be connected, or to a main valve unit of the parking brake valve arrangement in order thereby to output the release pressure or, in this case, the parking brake control pressure at the third shuttle valve port and correspondingly to provide same to the main valve unit such that the latter can then, in turn, generate the spring brake pressure from the received release pressure or parking brake control pressure.

In this way, it can be ensured that the spring brake cylinder remains ventilated if either a sufficient release pressure is provided via the release valve, or, on the other hand, release of holding brakes is requested via valves of the parking brake function.

In a second aspect of the disclosure, the object mentioned at the beginning is achieved by a parking brake valve arrangement for an electronically controllable pneumatic braking system for a utility vehicle, having a spring-type actuator port for connecting at least one spring brake cylinder a supply port for receiving supply pressure, a main valve unit, which receives the supply pressure and is configured to output a spring brake pressure to the spring-type actuator port in a manner dependent on a parking brake control pressure, a pilot control valve unit for providing the parking brake control pressure, and a fail-safety valve unit according to one of the above-described embodiments of a fail-safety valve unit according to the first aspect of the disclosure, which outputs the release pressure to the main valve unit, wherein the main valve unit is furthermore configured to output the spring brake pressure in a manner dependent on the release pressure. Both the parking brake control pressure and the release pressure are provided to the main valve unit of the parking brake valve arrangement.

The parking brake valve arrangement can be configured as per a conventional parking brake valve arrangement, and is also referred to as a holding brake module, EPH or the like. In this embodiment, the release pressure can be output to a conventional anti-compounding port of the parking brake valve arrangement. In this respect, it is also preferred for the pilot control valve unit and the main valve unit to be integrated into a common housing. The parking brake control pressure which is provided by the pilot control valve unit is output preferably in response to a parking brake signal which is triggered, for example, by a parking brake switch in a cab of the vehicle. The parking brake control pressure can also be output on the basis of a parking brake demand signal from a central module of a braking system.

In order to provide both the parking brake control pressure and the release pressure to the main valve unit, the parking brake valve arrangement, according to the second aspect of the disclosure, preferably has a shuttle valve, which is connected to the first release valve port for receiving the release pressure, to the pilot control valve unit for receiving the parking brake control pressure, and to the main valve unit for outputting the respectively higher of the release pressure and the parking brake control pressure to the main valve unit. The shuttle valve is accordingly preferably configured as a select-high valve.

Preferably, the main valve unit can have a relay valve, having a relay valve supply port connected to the supply port, a relay valve working port connected to the spring-type actuator port, a relay valve ventilating port connected to a vent, and a relay valve control port receiving the parking brake control pressure or the release pressure. The relay valve control port is preferably connected to the shuttle valve if such a shuttle valve is provided. Alternatively, the relay valve control port can also be connected directly to the release valve port and to the pilot control valve unit, for example via a T-piece.

Furthermore, it is preferred that the pilot control valve unit has a bistable valve, which has a first bistable valve port receiving the supply pressure, a second bistable valve port outputting the parking brake control pressure, and a third bistable valve port connected to a or to the vent. A bistable valve is a switching valve which has two stable switching states. Preferably, in a first, stable switching position, the first bistable valve port is connected to the second bistable valve port in a pressure-conducting manner, while, in a second, stable switching position, the third bistable valve port is connected to the second bistable valve port.

Furthermore, it is preferred that the pilot control valve unit has a 2/2-way switching valve for the graduated ventilating and/or maintaining of the parking brake control pressure. The 2/2-way switching valve is preferably open when de-energized and can be closed when energized. By this means for example, the output parking brake control pressure can be confined such that, irrespective of the switching position of the bistable valve, the parking brake control pressure at the main valve unit or the shuttle valve is maintained. It is also possible by this means for graduated aeration and/or ventilation to take place since a 2/2-way switching valve can be switched more rapidly and simply than a bistable valve.

Furthermore, it is preferred that the pilot control valve unit, the main valve unit, and an electronic control unit for providing switching signals to the pilot control unit are jointly integrated in a parking brake module. The electronic control unit is provided for the parking brake valve arrangement and controls at least the pilot control valve unit. It can additionally be provided that the electronic control unit also controls the fail-safety valve unit, in particular the release valve. In this case, it can additionally be provided that the fail-safety valve unit is fastened to the parking brake module or is integrated therein.

If a conventional parking brake module, as is already known in the prior art, is used as the parking brake valve unit or parking brake module, it is preferred for the release valve port to be connected to a release pressure port, also known as anti-compounding port, of the parking brake module and to provide the release pressure at the release pressure port. In this way, a conventional parking brake module can be used.

In a third aspect, the object mentioned at the beginning is achieved by a vehicle, in particular utility vehicle, having an electronically controllable pneumatic brake system and a parking brake valve arrangement according to one of the above-described embodiments of a parking brake valve arrangement according to the second aspect of the disclosure. It should be understood that the fail-safety valve unit according to the first aspect of the disclosure, the parking brake valve arrangement according to the second aspect of the disclosure, and the vehicle according to the third aspect of the disclosure have identical or similar sub-aspects. In this respect, for these aspects, reference is extensively made to the above description.

It must be taken into consideration that a wide variety of modifications and changes regarding the form and the detail of an embodiment may be made without departing from the general concept of the disclosure.

BRIEF DESCRIPTION OF THE DRAWINGS

The invention will now be described with reference to the drawings wherein.

DESCRIPTION OF THE PREFERRED EMBODIMENTS

A fail-safety valve unit 1 for a parking brake function 8 of an electronically controllable pneumatic braking system 204 (cf. FIG. 6) for a utility vehicle 202 has a monostable release valve 2 and a ventilating valve 4. In the embodiment shown in FIG. 1, the release valve 2 is configured as a first 3/2-way release valve 3, even though other valve forms are preferred and possible. Furthermore, the release valve 2 can also comprise further release valves, as is apparent from the further embodiments.

The release valve 2, in more precise terms in the first embodiment, the first 3/2-way release valve 3, has a first release valve port 2.1, which is connected to the parking brake function 8. Furthermore, the first 3/2-way release valve 3 has a second release valve port 2.2, which is connected to a supply 10 and receives supply pressure pV therefrom. A third release valve port 2.3 of the 3/2-way release valve 3 is connected to the ventilating valve 4. In the embodiment shown in FIG. 1, the ventilating valve 4 is formed from a pressure limiter 6 with a throttle 7 which is arranged parallel thereto and permits overflowing of the pressure limiter 6. The pressure limiter 6 itself is then in turn connected to a vent 33. The release valve 2 is configured in such a manner that, when de-energized, it is in the first switching position, which is shown in FIG. 1 and in which the first release valve port 2.1 is connected to the third release valve port 2.3, such that the first release valve port 2.1 is connected to the ventilating valve 4 and is ventilated.

Figure 1:
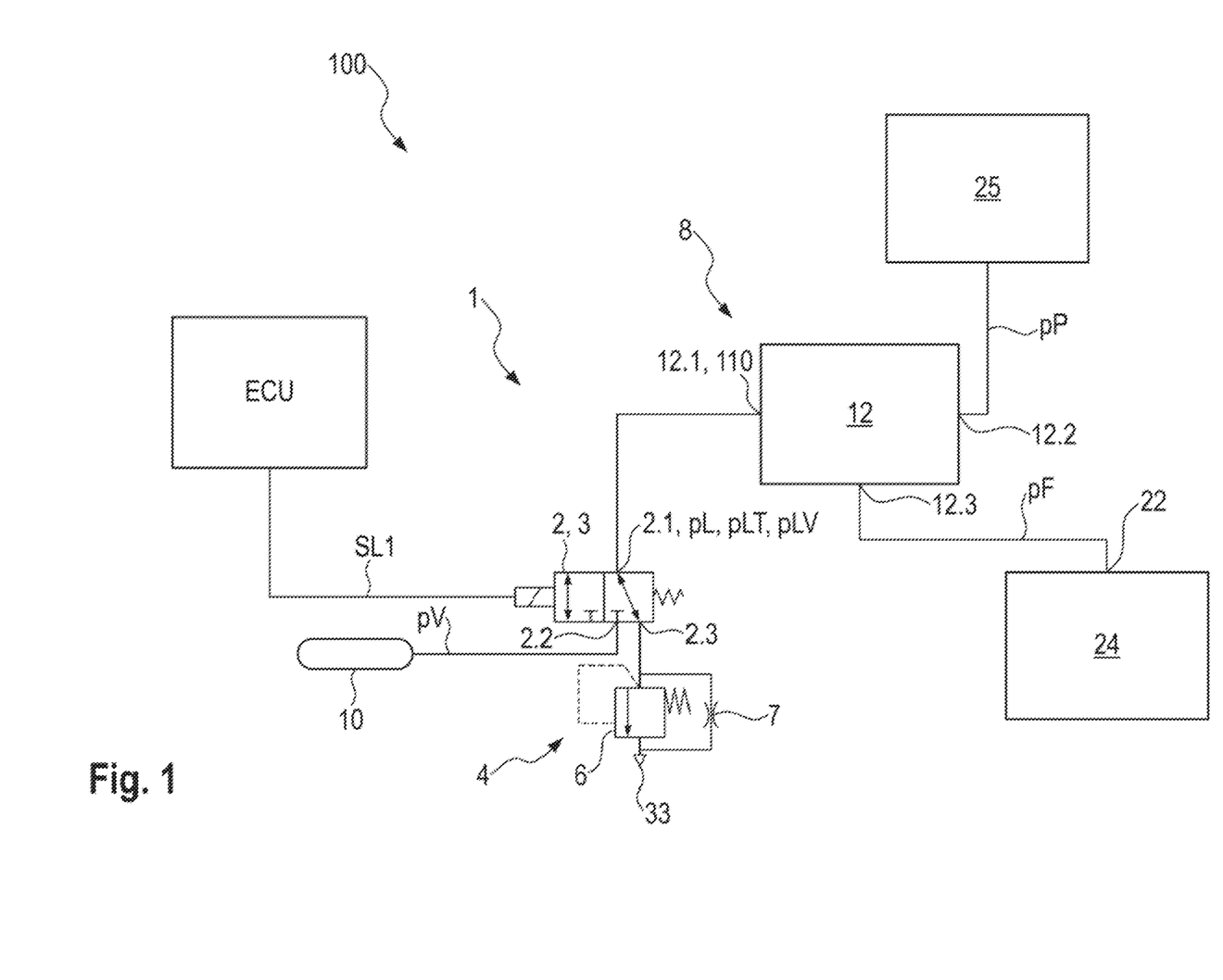
FIG. 1 shows a schematic view of a fail-safety valve unit with peripheral devices connected thereto.

In the embodiment shown in FIG. 1, the release valve 2 is controlled by an electronic control unit ECU which can be any electronic control unit of the electronically controllable pneumatic braking system 204, for example the electronic control unit of a central module, of an axle modulator, of a parking brake module, of a steering unit or the like. The electronic control unit ECU provides a first release signal SL1 to the release valve 2 in order to bring the latter from the first switching position, shown in FIG. 1, into the second switching position, not shown in FIG. 1. In the second switching position, not shown in FIG. 1, the first release valve port 2.1 is connected to the second release valve port 2.2, such that the supply pressure pV is put through and a release pressure pL is output at the first release valve port 2.1. The release pressure pL is then provided at the parking brake function 8 which can use the release pressure pL as control pressure or as volume pressure, depending on the embodiment, in order to aerate and thus to release the spring brake cylinder 24.

In the embodiment shown in FIG. 1, the first release valve port 2.1 is connected to a shuttle valve 12 via which the release valve 2 can input the release pressure pL into the parking brake function 8. Embodiments are also preferred in which the release valve 2 is connected via the first release valve port 2.1 to a release pressure port 110, also referred to as anti-compounding port, of the parking brake function 8. Such embodiments will be described in more detail further on. They have the advantage that conventional parking brake modules can be used with such a release pressure port in order to supplement them in a simple manner by a safety function via the fail-safety valve unit, as herein described.

Figure 2:
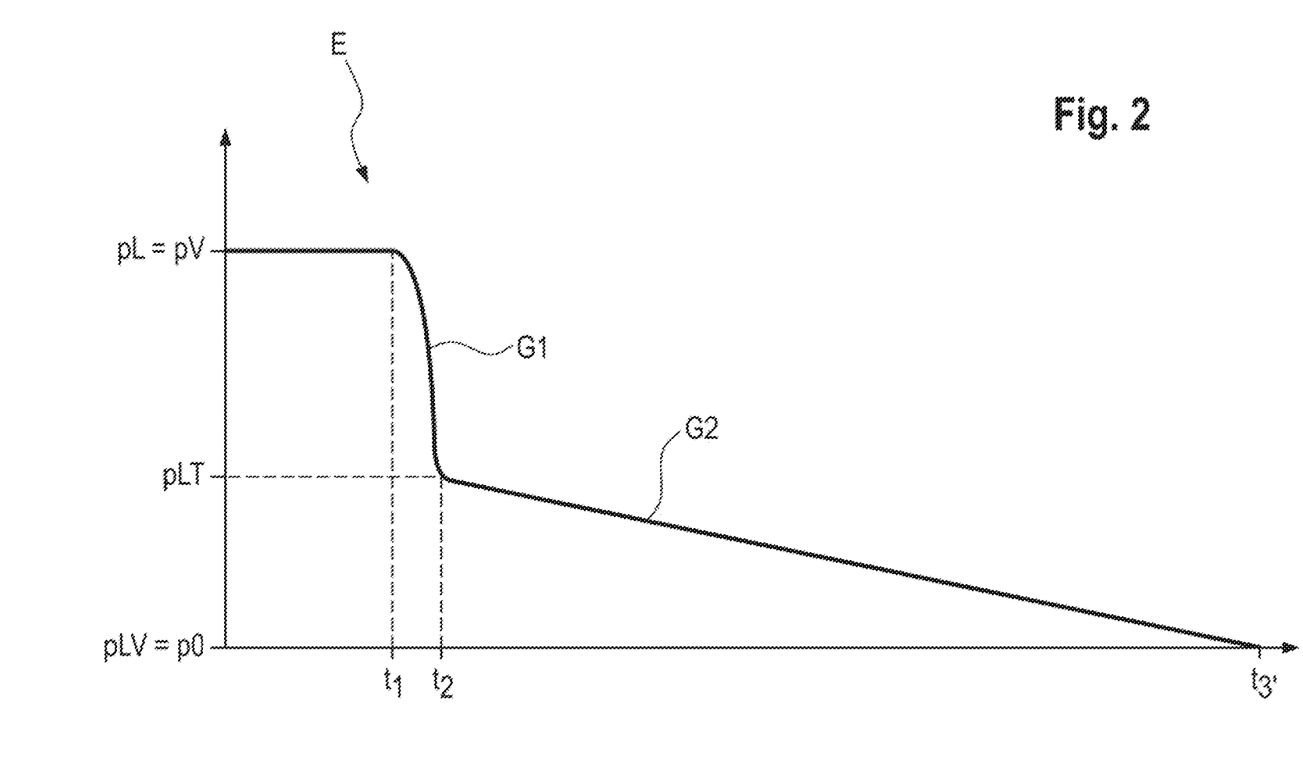
FIG. 2 shows a pressure profile of the ventilating characteristics.

The combination in the ventilating valve 4 with pressure limiter 6 and throttle makes it possible in a simple manner to implement a nonlinear ventilating characteristic E, as illustrated in FIG. 2. For the situation in which a fault occurs in the braking system 204 and, as a consequence, the electronic control unit ECU does not provide the first release signal SL1, the release valve 2 falls back into the first switching state which is shown in FIG. 1 and in which the first release valve port 2.1 is connected to the third release valve port 2.3 such that the first release valve port 2.1 is connected to the ventilating valve 4. The release pressure pL output at this time at the first release valve port 2.1 is consequently ventilated. The pressure limiter 6 then first of all permits ventilating to a partial brake pressure pLT with a first gradient G1 (cf. FIG. 2), and, as soon as the limit pressure, in this case the partial brake pressure pLT, is reached, remaining ventilating of the first release valve port 2.1 to a full brake pressure pLV, which can preferably correspond to the ambient pressure, is implemented via the throttle 7, this being performed with a second gradient G2.

As can be gathered in particular from FIG. 2, the first gradient G1 is significantly greater than the second gradient G2. At a time t1 at which the first release signal SL1 ceases and, as a consequence, the release valve 2 is switched into the first switching position, shown in FIG. 1, the first release valve port 2.1 is ventilated with the first gradient G1, wherein the pressure drops from the release pressure pL, which can correspond to the supply pressure pV, to the partial brake pressure pLT. If this is achieved (time t2), the pressure drops from the partial brake pressure pLT to the full brake pressure pLV with the second gradient G2. The full brake pressure pLV is then reached only at the time t3. As can easily be gathered from FIG. 2, the distance between the second time t2 and the third time t3 is significantly greater than the distance between the first time t1 and the second time t2, namely is approximately 15.5 times as long. As likewise emerges from FIG. 2, the first gradient G1 is approximately 20 times the size of the second gradient G2, wherein the first gradient G1 is likewise nonlinear and the second gradient G2 substantially linear. The first gradient G1 is in fact formed in accordance with an exponential function, wherein the mean value of the first gradient G1 is approximately 4.2 in the example shown in FIG. 2. Other magnitudes and ratios are also preferred, for example a factor of 10 or more. It is important that rapid ventilation is performed from the release pressure pL to the partial brake pressure pLT in order to rapidly achieve partial braking and thus a partial deceleration of the vehicle, but then slow ventilation is performed from the partial brake pressure pLT to the full brake pressure pLV in order to prevent axles from locking and an uncontrolled deceleration of the vehicle.

Figure 3:
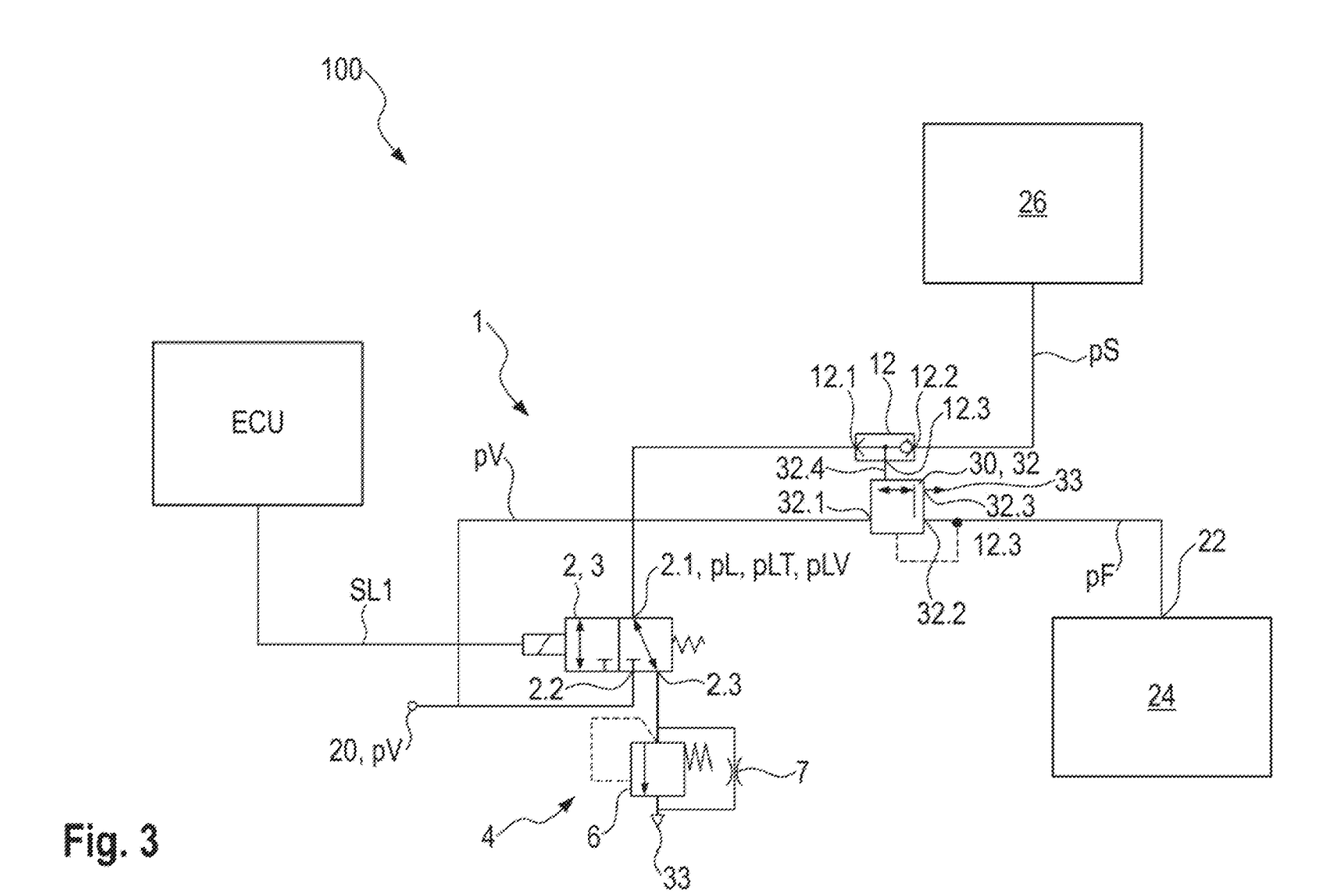
FIG. 3 shows a schematic illustration of the fail'-safety valve unit in a second embodiment.

The second embodiment of a fail-safety valve unit 1 that is shown in FIG. 3 is based substantially on the first embodiment shown in FIG. 1 and to this extent reference is extensively made to the above description. The differences in particular are emphasized below. Identical and similar elements are provided with the same reference designation.

While, in the first embodiment (FIG. 1), a parking brake unit 25 is connected to the shuttle valve 12, the parking brake unit providing a parking brake pressure pP which can be used directly as volume pressure, and the release pressure pL is also developed as volume pressure, and the shuttle valve 12 outputs the respectively higher of the release pressure pL and of the parking brake pressure pP as spring brake pressure pF to the spring brake cylinders 24, the second embodiment, shown in FIG. 3, initially uses a parking brake control pressure pS as input pressure for the shuttle valve 12. In a corresponding manner, the release pressure pL in the embodiment shown in FIG. 3 is also configured as control pressure. In the second embodiment, shown in FIG. 3, the parking brake control pressure pS is provided by a handbrake valve 26, as is the case, for example, in American vehicles. Such a handbrake valve can be arranged, for example, in the cab of the vehicle and activated by actuation by the driver, In the embodiment shown in FIG. 3, the shuttle valve 12 is configured in turn as a select-high valve and has a first shuttle valve port 12.1, a second shuttle valve port 122 and a third shuttle valve port 12.3. The first shuttle valve port 12.1 is connected to the first release valve port 2.1 and receives the release pressure pL. The second shuttle valve port 2.1 is connected to the handbrake valve 26 and receives the parking brake control pressure pS. In the embodiment shown in FIG. 3, the third shuttle valve port 12.3 is connected to a relay valve 32 which is used for boosting the volume of the parking brake control pressure pS or the release pressure pL.

The relay valve 32 has a relay valve supply port 32.1 which is connected to the supply port 20 and receives supply pressure pV. The supply port 20 can in turn be connected to the supply 10, as has already been described with respect to FIG. 1. Furthermore, the relay valve 32 has a relay valve working port 32.2 at which the volume-boosted pressure is output as spring brake pressure pF. The relay valve working port 32.2 is then connected to a spring-type actuator port 22 to which one or more spring brake cylinders 24 can be connected. The relay valve 32 furthermore has a relay valve ventilating port 32.3 for ventilating the spring-type actuator port 22, and a relay valve control port 32.4, which is connected to the third shuttle valve port 12.3 and receives the pressure output by the shuttle valve 12, that is, the respectively higher of the release pressure pL and of the parking brake control pressure pS.

The release valve 2 and the ventilating valve 4 are configured as in FIG. 1, and therefore reference is made in their regard to the above description.

Figure 4:
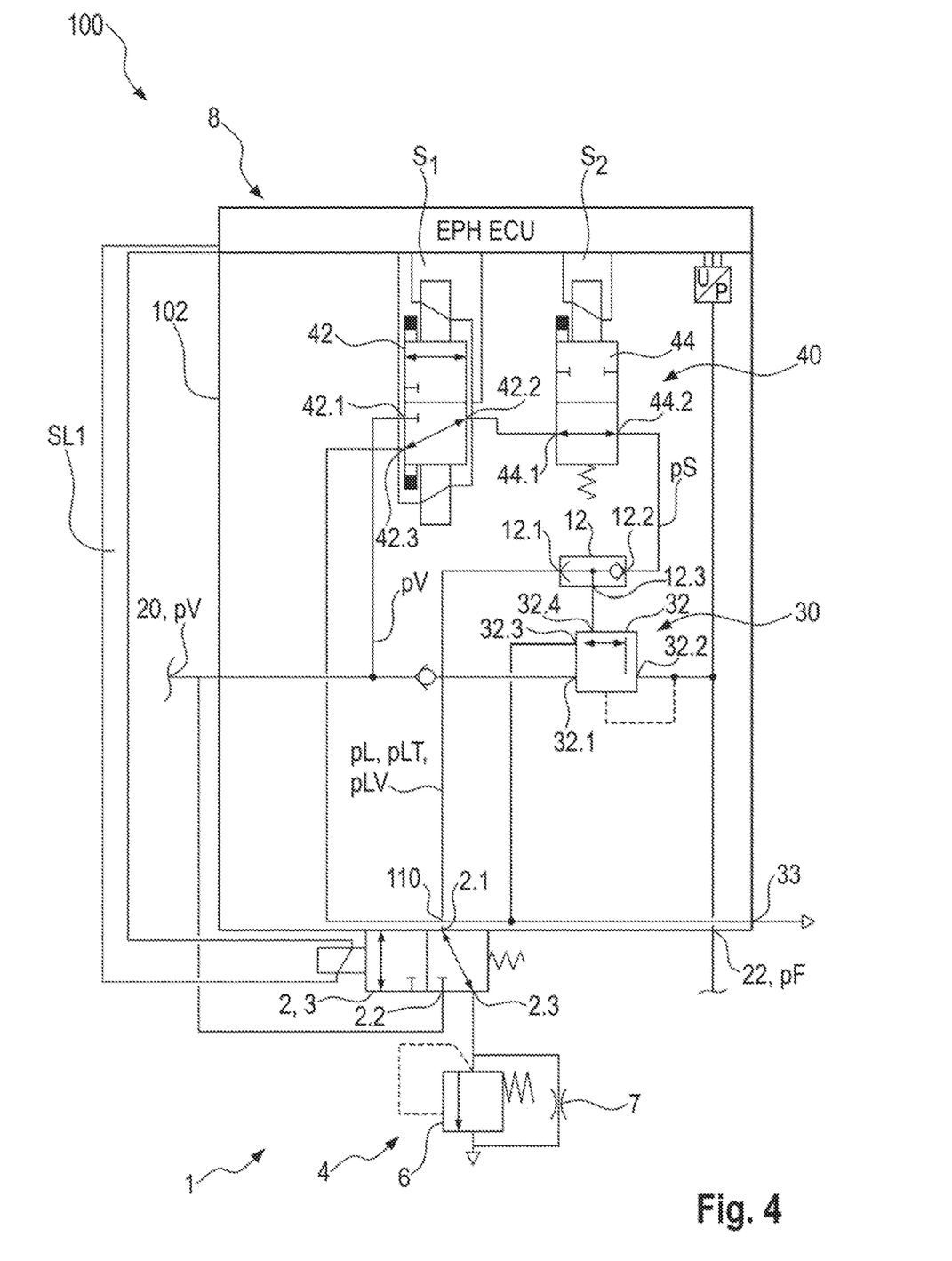
FIG. 4 shows a parking brake valve arrangement according to a t embodiment.
Figure 5:
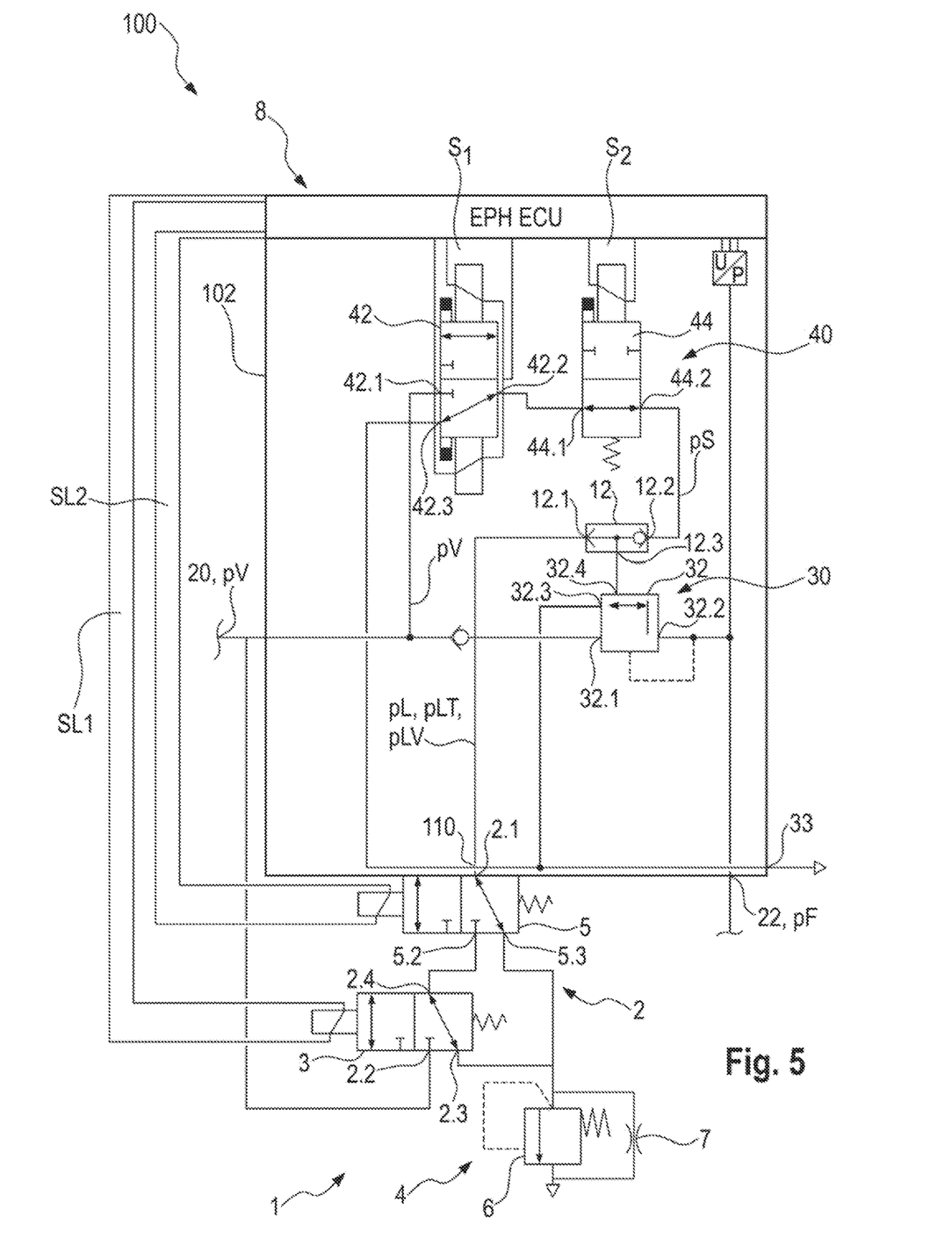
FIG. 5 shows a parking brake valve arrangement according to a second embodiment; and, FIG. 6 shows a vehicle.

The embodiments of FIGS. 4 and 5 then each show a parking brake valve arrangement 100 which is formed from a parking brake module 102 and a fail-safety valve unit 1.

These two embodiments (FIGS. 4 and 5) therefore represent integrated arrangements. In the two embodiments, the release valve 2 is in each case flange-mounted directly on the parking brake module 102, but it should be understood that the release valve 2 can also be integrated in the parking brake module 102, as a result of which advantages in the installation can be achieved.

The parking brake module 102 is substantially constructed as known from the prior art. It comprises a supply port 20, which is connected to a compressed air supply, for example the supply 10, and receives supply pressure pV. Furthermore, it has a spring-type actuator port 22, for connecting at least one spring brake cylinder 24 at which the spring brake pressure pF is provided. Furthermore, the parking brake module 102 has a ventilating port 33 which can be connected to a vent.

A main valve unit 30 and a pilot control valve unit 40 are provided in the interior of the parking brake module 102, which is provided for implementing the parking brake function 8. The main valve unit 30 has the relay valve 32 already described here. In the embodiment shown here, the pilot control valve unit 40 has a bistable valve 42 and a 2/2-way switching valve 44 which serves as a holding valve. However, the pilot control valve unit 40 may also be configured in some other way, for example by two or three 3/2-way valves or 2/2-way valves, which can also be configured in monostable form.

The bistable valve 42 is configured as a 3/2-way valve and has a first bistable valve port 42.1 which is connected to the supply port 20 and receives supply pressure pV. Furthermore, it has a second bistable valve port 42.2 which is connected to the 2/2-way switching valve, in more precise terms to a first switching valve port 44.1. A third bistable valve port 42.3 is connected to the ventilating port 33. The bistable valve 42 has two stable switching positions and can switch between them via a first switching signal S1 which is provided by an electronic control unit ECU integrated in the parking brake module 102. In the first switching position, shown in FIG. 4, the third bistable valve port 42.3 is connected to the second bistable valve port 42.2 such that the latter is connected to the vent. By contrast, in the second switching position, not shown in FIG. 4, the first bistable valve port 42.1 is connected to the second bistable valve port 42.2 such that the supply pressure pV is put through.

In addition to the first switching valve port 44.1, the 2/2-way switching valve 44 has a second switching valve port 44.2 which is connected to the main valve unit 30 in order to provide the parking brake control pressure pS at the latter. In the embodiment shown in FIG. 4, the second switching valve port 44.2 is connected to the shuttle valve 12, in detail to the second shuttle valve port 12.2, as has basically already been described with respect to FIGS. 1 and 3. The 2/2-way switching valve 44, when de-energized and in monostable form, is in an open first switching position which is shown in FIG. 4 and in which the first switching valve port 44.1 is connected to the second switching valve port 44.2. In the second switching position, not shown in FIG. 4, the 2/2-way switching valve 44 is closed. In order to switch the 2/2-way switching valve 44, a second switching signal S2 is provided by the electronic control unit ECU. The 2/2-way switching valve 44 serves in particular to confine a pressure, which is output via the bistable valve 42 and is then provided as parking brake control pressure pS via the 2/2-way switching valve 44, between the latter and the shuttle valve 12. The 2/2-way switching valve 44 can also be used to ventilate the main valve unit 30 in a graduated manner in order via the latter to achieve a graduated ventilating of the spring-type actuator port 22, for example if the spring brake cylinders 24 which are connected to the spring-type actuator port 22 are intended to be used for additional or auxiliary braking.

In the embodiment shown in FIG. 4, the fail-safety valve unit 1 is connected to a release pressure port 110 of the parking brake module 102. A release pressure port 110 is also known as an anti-compounding port and permits a manual output of a control pressure via the release pressure port 110 to the main valve unit 30. For this purpose, the release pressure port 110 is connected to the first shuttle valve port 12.1 of the shuttle valve 12. The shuttle valve 12 is configured in such a manner that in each case the higher of the parking brake control pressure pS and the pressure provided via the release pressure port 110 is output at the third shuttle valve port 12.3 and thus provided to the main valve unit 30. In particular to the relay valve control port 32.4.

However, it is not absolutely necessary for the fail-safety valve unit to be connected to such a release pressure port 110; on the contrary, the first release valve port 2.1 can also be connected directly to the shuttle valve 12, either directly or via a corresponding pressure line.

In the embodiment shown in FIG. 4, the release valve 2 is also electrically controlled by the electronic control unit ECU of the parking brake module 102 which provides the first release signal SL1. The latter is preferably always provided when the vehicle is in operation. Conventionally, the operation then proceeds as follows: if the utility vehicle 202 is started, first of all the bistable valve 42 is brought from the first switching position, shown in FIG. 4, into the second switching position, not shown in FIG. 4, such that the supply pressure pV is output at the 2/2-way switching valve 44 and provided by the latter as parking brake control pressure pS to the main valve unit 30. As a consequence, the spring brake pressure pF is output via the main valve unit 30 to the spring-type actuator port 22, and the spring brake cylinders 24 connected to the spring-type actuator port 22 are aerated and therefore released. Subsequently, by energizing the 2/2-way switching valve 44, the parking brake control pressure pS can be enclosed and the bistable valve 42 can either remain in the second switching position or can be switched back into the first switching position.

At the same time, the first release signal is preferably provided such that the release valve, the first 3/2-way release valve 3 in FIG. 4, is brought into the second switching position, which is likewise not shown in FIG. 3 and in which the second release valve port 2.2 is connected to the supply port 20, and therefore supply pressure pV is provided via the release valve 2 at the release pressure port 110 and output via the latter to the first shuttle valve port 12.1. The release pressure pL and the parking brake control pressure pS are intended generally to be approximately identical in magnitude. For the situation in which the parking brake control pressure pS drops, for example due to a leakage in the 2/2-way switching valve 44, the release pressure pL is higher and continues to be output via the shuttle valve 12. The spring brake cylinders 24 remain aerated.

If a fault now occurs, in particular a fault in the electronic control unit ECU of the parking brake module 102, the 2/2-way switching valve 44 falls back into the first switching position which is shown in FIG. 4 and in which it is open, and therefore the parking brake control pressure pS is directly ventilated if the bistable valve 42 has been switched back into the first switching position, shown in FIG. 4. In order then to prevent direct engagement of the spring brake cylinders 24, which would cause immediate locking of the corresponding vehicle axles, the fail-safety valve unit 1 is provided. If the 2/2-way switching valve 44 falls back into the first switching position, shown in FIG. 4, the release pressure pL is higher than the parking brake control pressure pS, and therefore the release pressure pL is provided to the main valve unit 30 by the shuttle valve 12. Since, however, the first switching signal SL1 also ceases at the same time, the first 3/2-way release valve 3 also falls into the first switching position, which is shown in FIG. 4 and in which the first release valve port 2.1 is connected to the third release valve port 2.3, which, for its part, is connected to the ventilating valve 4. In this case, the release pressure port 110 is ventilated in accordance with the nonlinear ventilating characteristic E (cf. FIG. 2) such that the vehicle is initially rapidly braked with the first gradient G1, but without locking, and is then fully braked with the second gradient G2 and brought to a standstill.

FIG. 5 shows a second embodiment of the parking brake valve arrangement 100 that is substantially based on the first embodiment of the parking brake valve arrangement 100 (FIG. 4). In contrast to the first embodiment (FIG. 4), in the second embodiment (FIG. 5) the release valve 2 is formed not only with a first 3/2-way release valve 3, but also with a second 3/2-way release valve 5. In this case, the second 3/2-way release valve 5 forms the first release valve port 21 which here in turn is connected to the release pressure port 110 of the parking brake module 102, but may also be directly connected to the first shuttle valve port 12.1. As already described with reference to FIG. 4, the second and third release valve ports 2.2, 2.3 are formed on the first 3/2-way release valve 3 and are again connected in the same manner, namely such that the second release valve port 2.2 is connected to the supply port 20 and receives supply pressure pV, and the third release valve port 2.3 is connected to the ventilating valve 4.

The second 3/2-way release valve 5 also has further ports, namely a fourth release valve port 5.2 and a fifth release valve port 5.3. The fifth release valve port 5.3 is directly connected to the ventilating valve 4 while the fourth release valve port 5.2 is connected to the first 3/2-way release valve 3, in more precise terms to a sixth release valve port 2.4. The two valves, the first 3/2-way release valve 3 and the second 3/2-way release valve 5, are configured in such a manner that, when de-energized, they are in the first switching position, shown in FIG. 5, wherein in each case the fifth release valve port 5.3 and the third release valve port 2.3 are connected to the ventilating valve 4. The first and second 3/2-way release valves 3, 5 can be brought by first and second release signals SL1, SL2 into the respective second switching position, not shown in FIG. 5. If first of all the first 3/2-way release valve 3 is brought into the second switching position, not shown in FIG. 5, the second release valve port 2.2 is connected to the sixth release valve port 2.4 such that the supply pressure pV is provided via the first 3/2-way release valve to the fourth release valve port 5.2. Since, however, the second 3/2-way release valve 5 at this time is still in the first switching position, shown in FIG. 5, the release pressure port 110 remains connected to the ventilating valve 4. No release pressure pL is output at the shuttle valve 12 and therefore not at the main valve unit 30 either.

For the reverse case in which only the second release signal SL2 is provided, and not the first release signal SL1, the first 3/2-way release valve therefore remains in the first switching position, shown in FIG. 5, and only the second 3/2-way release valve 5 switches into the second switching position, not shown in FIG. 5. In this position, the first release valve port 2.1 is brought into connection with the fourth release valve port 5.2 such that the release pressure port 110 is connected fluidically in terms of pressure to the sixth release valve port 2.4 of the first 3/2-way release valve 3. Since, however, the latter is still in the first switching position, shown in FIG. 5, the sixth release valve port 2.4 is connected to the third release valve port 2.3 which, in turn, is connected to the ventilating valve 4 such that, in turn, the release pressure port 110 is connected fluidically in terms of pressure to the ventilating valve 4. A release pressure pL is in turn not output to the main valve unit 30. Only when both the first and the second 3/2-way release valves 3, 5 are brought into the respective second switching positions, not shown in FIG. 5, is the second release valve port 2.2 connected fluidically in terms of pressure to the first release valve port 2.1 such that the release pressure pL is output. That is, as soon as either the first release signal SL1 or the second release signal SL2 cease, the release pressure port 110 is ventilated via the ventilating valve 4 and the vehicle is braked in a controlled manner.

Even though, in the embodiment shown in FIG. 5, both the first and the second release signal SL1, SL2 are provided by the electronic control unit ECU of the parking brake module 102, it should be understood that they can also be provided by different modules. For example, it is conceivable and preferred for the second release signal SL2 to be output from a central module of the utility vehicle.

Figure 6:
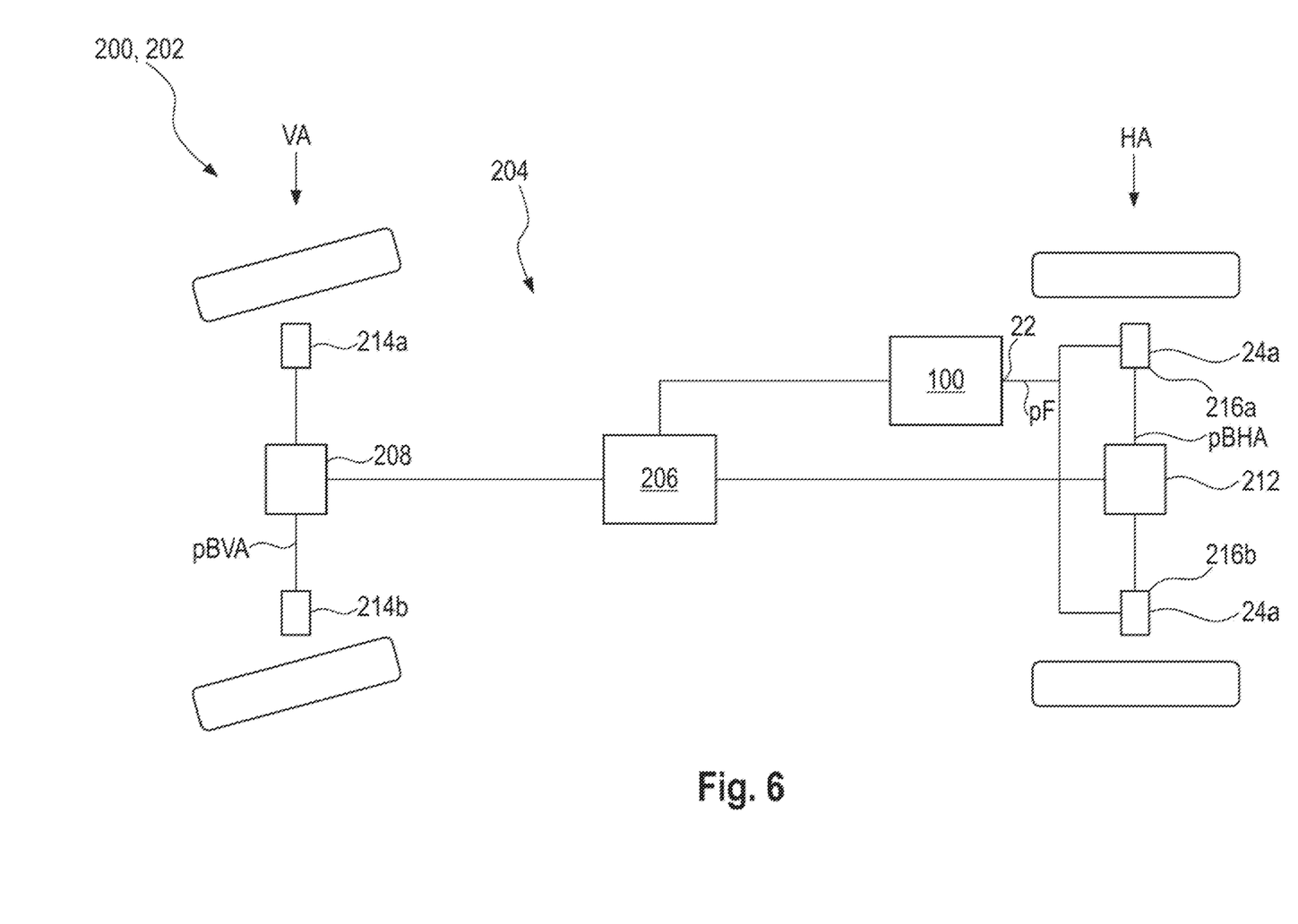

FIG. 6 now illustrates a vehicle 200, in particular a utility vehicle 202, which has an electronically controllable pneumatic braking system 204. The electronically controllable pneumatic braking system 204 has a central module 206 which controls both a front axle modulator 208 and a rear axle modulator 212. At the front axle VA, first and second front axle service brake cylinders 214a, 214b are provided, at which a front axle brake pressure pBVA can be output via the front axle modulator 208. At the rear axle HA, rear axle service brake cylinders 216a, 216b are likewise provided which are accommodated here in combined cylinders together with the spring brake cylinders 24a, 24b. The rear axle modulator 212 is also output from the central module 206 and provides a rear axle brake pressure pBHA to the first and second rear axle service brake cylinders 216a, 216b. Furthermore, a parking brake valve arrangement 100 is provided at the rear axle HA, with a spring-type actuator port 22 at which the spring brake pressure pF is output. As described above, the parking brake valve arrangement comprises a parking brake module 102 and a fail-safety valve unit 1 according to one of the above-described types.

It is understood that the foregoing description is that of the preferred embodiments of the invention and that various changes and modifications may be made thereto without departing from the spirit and scope of the invention as defined in the appended claims.

LIST OF DESIGNATIONS (PART OF THE DESCRIPTION)

1 Fail-safety valve unit
2 Monostable release valve
2.1 First release valve port
2.2 Second release valve port
2.3 Third release valve port
2.4 Sixth release valve port
3 First 3/2-way release valve
4 Ventilating valve
5 Second 3/2-way release valve
5.2 Fourth release valve port
5.3 Fifth release valve port
6 Pressure limiter
7 Throttle
8 Parking brake function
10 Supply
12 Shuttle valve
12.1 First shuttle valve port
12.2 Second shuttle valve port
12.3 Third shuttle valve port
20 Supply port
22 Spring-type actuator port
24 Spring brake cylinder
25 Parking brake unit
26 Handbrake valve
30 Main valve unit
32 Relay valve
32.1 Relay valve supply port
32.2 Relay valve working port
32.3 Relay valve ventilating port
32.4 Relay valve control port
33 Vent
40 Pilot control valve unit
42 Bistable valve
42.1 First bistable valve port
42.2 Second bistable valve port
42.3 Third bistable valve port
44 2/2-way switching valve
44.1 First switching valve port
44.2 Second switching valve port
100 Parking brake valve arrangement
102 Parking brake module
110 Release pressure port (anti-compounding port)
200 Vehicle
202 Utility vehicle
204 Electronically controllable pneumatic braking system
206 Central module
208 Front axle modulator
212 Rear axle modulator
214a, 214b Front axle service brake cylinder
216a, 216b Rear axle service brake cylinder
E Ventilating characteristic
ECU Electronic control unit
G1 First gradient
G2 Second gradient
pBHA Rear axle brake pressure
pBVA Front axle brake pressure
pF Spring brake pressure
pL Release pressure
pLT Partial brake pressure
pLV Full brake pressure
PS Parking brake control pressure
pV Supply pressure
S1 First switching signal
S2 Second switching signal
SL1 First release signal
SL2 Second release signal
VA Front axle
HA Rear axle

What is claimed is:

1. A fail-safety valve unit for a parking brake function of an electronically controllable pneumatic braking system for a vehicle, the fail-safety valve unit comprising:
    a monostable release valve including a first release valve port;
    a parking brake function;
    a ventilating valve;
    said monostable release valve being configured, when energized, to provide a release pressure (pL) at said first release valve port for said parking brake function and, when deenergized, connecting said first release valve port to said ventilating valve for ventilating said first release valve port;
    said ventilating valve having a non-linear ventilating characteristic (E) to permit ventilating said first release valve port from said release pressure (pL) to a partial brake pressure (pLT) via a first gradient (G1) and ventilating said first release valve port from said partial brake pressure (pLT) to a full brake pressure (pLV) via a second gradient (G2); and,
    said first gradient (G1) being greater than said second gradient (G2).

2. The fail-safety valve unit of claim 1, wherein said ventilating valve further has at least one pressure limiter and at least one throttle arranged in parallel to said pressure limiter to permit overflowing of said pressure limiter.

3. The fail-safety valve unit of claim 1, further comprising:
    a supply for providing a supply pressure (pV);
    said monostable release valve having a first 3/2-way release valve with a second release valve port and with a third release valve port; and,
    said second release valve port being connected to said supply for receiving said supply pressure (pV) and said third release valve port being connected to said ventilating valve.

4. The fail-safety valve unit of claim 3, wherein said monostable release valve has a second 3/2-way release valve having said first release valve port.

5. The fail-safety valve unit of claim 4, wherein said second 3/2-way release valve has a fourth release valve port connected to said first 3/2-way release valve and a fifth release valve port connected to said ventilating valve.

6. The fail-safety valve unit of claim 1, further comprising a shuttle valve connected to said first release valve port for inputting said release pressure (pL) into said parking brake function.

7. A parking brake valve arrangement for an electronically controllable pneumatic braking system for a vehicle, the parking brake valve arrangement comprising:
    a spring-type actuator port for connecting at least one spring brake cylinder thereto;
    a supply port for receiving supply pressure (pV);
    a main valve unit for receiving said supply pressure (pV) and being configured to output a spring brake pressure (pF) to said spring-type actuator port in dependence upon a parking brake control pressure (pS);
    a pilot control valve unit for providing said parking brake control pressure (pS);
    a fail-safety valve unit including a monostable release valve including a first release valve port;
    a parking brake function;
    a ventilating valve;
    said monostable release valve being configured, when energized, to provide a release pressure (pL) at said first release valve port for said parking brake function and, when deenergized, connecting said first release valve port to said ventilating valve for ventilating said first release valve port;
    said ventilating valve having a non-linear ventilating characteristic (E) and being configured to permit ventilating said first release valve port from said release pressure (pL) to a partial brake pressure (pLT) via a first gradient (G1) and ventilating said first release valve port from said partial brake pressure (pLT) to a full brake pressure (pLV) via a second gradient (G2); and,
    said first gradient (G1) being greater than said second gradient (G2);
    said fail-safety valve unit being configured to output said release pressure (pL) to said main valve unit; and,
    said main valve unit being further configured to output said spring brake pressure (pF) in dependence upon said release pressure (pL).

8. The parking brake valve arrangement of claim 7, wherein said fail-safety valve unit further includes a shuttle valve; and, said shuttle valve is connected to:
    said first release valve port for receiving said release pressure (pL);
    said pilot control valve unit for receiving said parking brake control pressure (pS); and,
    said main valve unit for outputting the respective higher one of said release pressure (pL) and said parking brake control pressure (pS) to said main valve unit.

9. The parking brake valve arrangement of claim 7, wherein said main valve unit has a relay valve and said relay valve has: a relay valve supply port connected to said supply port for receiving said supply pressure (pV); a relay valve working port connected to said spring-type actuator port; a relay valve ventilating port connected to a vent; and, a relay valve control port receiving said parking brake control pressure (pS) or said release pressure (pL).

10. The parking brake valve arrangement of claim 7, wherein said pilot control valve unit has a bistable valve having: a first bistable valve port receiving said supply pressure (pV); a second bistable valve port outputting said parking brake control pressure (pS); and, a third bistable valve port connected to one of said vent and a vent.

11. The parking brake valve arrangement of claim 7, wherein said pilot control valve has a 2/2-way switching valve for at least one of the graduated ventilating of the parking brake control pressure (pS) and the maintaining of the parking brake control pressure (pS).

12. The parking brake valve arrangement of claim 7, wherein said pilot control valve unit, said main valve unit and an electronic control unit (ECU) for providing switching signals (S1, S2) to said pilot control valve unit are all conjointly integrated into a parking brake module.

13. The parking brake valve arrangement of claim 12, wherein said fail-safety valve unit is fastened to said parking brake module and said monostable release valve is electrically connected to said electronic control unit (ECU).

14. The parking brake valve arrangement of claim 12, wherein said parking brake module has a release pressure port connected to said first release valve port for receiving said release pressure (pL).

15. A vehicle comprising the electronically controllable pneumatic braking system and parking brake valve arrangement of claim 7.

* * * * *

UNITED STATES PATENT AND TRADEMARK OFFICE
CERTIFICATE OF CORRECTION

| | | |
|---|---|---|
| PATENT NO. | : 12,109,987 B2 | Page 1 of 1 |
| APPLICATION NO. | : 17/832357 | |
| DATED | : October 8, 2024 | |
| INVENTOR(S) | : van Thiel et al. | |

It is certified that error appears in the above-identified patent and that said Letters Patent is hereby corrected as shown below:

In the Specification

In Column 2:
Line 34: delete "201910152459" and insert -- 2019/0152459 --
Line 42: delete "201910248350" and insert -- 2019/0248350 --

In Column 4:
Line 7: delete "mare" and insert -- more --

In Column 7:
Line 30: delete "fail'-safety" and insert -- fail-safety --
Line 33: delete "a t embodiment" and insert -- a first embodiment --

In Column 9:
Line 44: delete "122" and insert -- 12.2 --
Line 48: delete "2.1" and insert -- 12.2 --

In Column 11:
Line 26: delete "30. In" and insert -- 30, in --
Line 53: insert -- SL1 -- after "signal"

In Column 12:
Line 34: delete "21" and insert -- 2.1 --

Signed and Sealed this
Third Day of June, 2025

Coke Morgan Stewart
*Acting Director of the United States Patent and Trademark Office*